Jan. 12, 1932.  C. R. CRANNELL  1,841,092
PEDAL ACCELERATOR CONTROL
Filed April 25, 1929
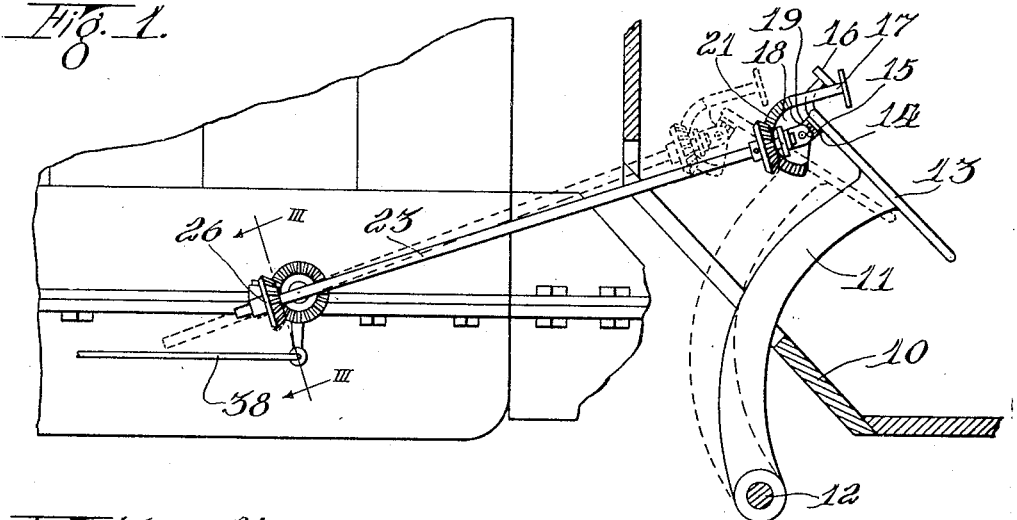
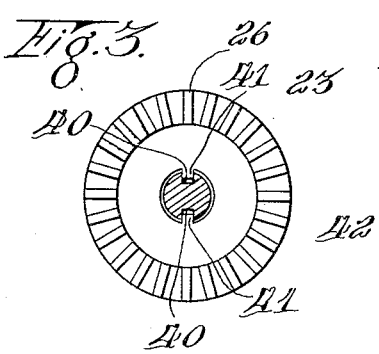
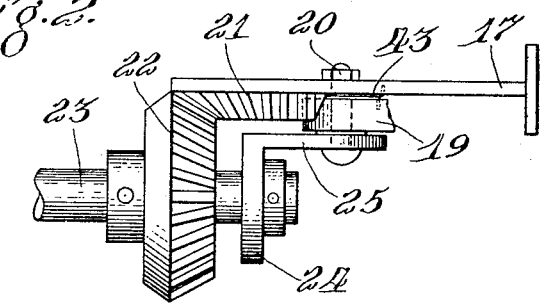
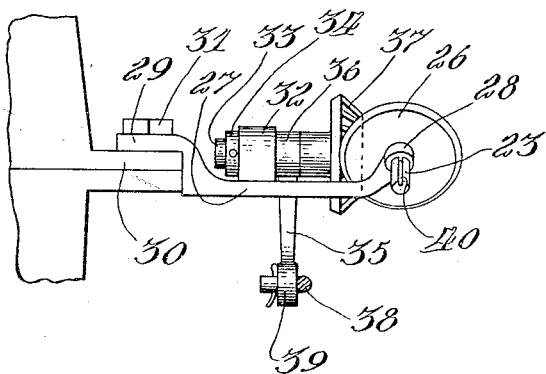
Inventor.
Charles R. Crannell.
By Harry C. Aberts
Atty.

Patented Jan. 12, 1932

1,841,092

UNITED STATES PATENT OFFICE

CHARLES R. CRANNELL, OF CHICAGO, ILLINOIS

PEDAL ACCELERATOR CONTROL

Application filed April 25, 1929. Serial No. 357,914.

This invention relates to carburetor controls and more particularly to pedal accelerators for vehicles, although it may be employed with equal advantage for other purposes.

It contemplates more especially the provision of throttle control means in conjunction with a vehicle braking pedal; however, such may be applied with equal advantage to the clutch or other operating mechanism.

Throttle controls have heretofore been employed in connection with vehicle braking pedals, but these have not proven entirely satisfactory in that they are complicated, not capable of convenient manipulation, and are influenced in the braking of the vehicle to the extent of throttling the engine to minimum speed. This is not always desirable, especially on inclines where it may be necessary to apply the brake and yet maintain or initiate the operation of the engine at a speed much in excess of idling.

As a consequence, throttle devices of this character should be totally unaffected by the manipulation of the pedal with which it is associated to enable a dual control. Moreover, devices of known construction are intricate and require a specially constructed pedal, thereby rendering the throttle controls incapable of use with standard pedals customarily employed in automobiles and other vehicles.

One object of the present invention is to simplify the construction and improve the operation of devices of the character mentioned.

Another object is the provision of a simple and inexpensive throttle control in association with a vehicle pedal for selective operation without any additional manual application.

Still another object is to provide a toe manipulated throttle lever in association with a foot pedal normally operative without any throttling effect.

A further object is to provide a very simple and effective throttling device in operative connection with a foot pedal for manipulation in any position thereof.

A still further object is to provide a throttling lever which may be readily secured to a brake pedal of standard construction for selective manipulation entirely independent of pedal movement.

Still a further object is to provide an operative connection between a vehicle carburetor and brake pedal to enable selective throttle control in any position of the pedal.

Other objects and advantages will appear from the following description of an illustrative embodiment of the present invention.

In the drawings:

Figure 1 is a side view in elevation of a device embodying features of the present invention.

Figure 2 is a detail view in plan of the throttle control lever and connecting parts.

Figure 3 is a sectional view taken substantially along the line 111—111 of Figure 2.

Figure 4 is a view in elevation of throttle instrumentalities and their supporting bracket.

The structure selected for illustration is shown in association with a vehicle 10 having the customary brake pedal 11 which is fixed to a brake rod control shaft 12 of standard construction and arrangement. The usual brake rods (not shown) are operatively connected to the shaft 12 which is partially rotated by depressing the brake lever 11 in a counterclockwise direction (viewed from Figure 1). To this end the brake lever 11 has the customary foot pedal 13 integrally or otherwise associated therewith to establish a rigid joinder therewith, thereby receiving the operator's foot for manipulating the brake with the required pressure.

In order to throttle the carbureter without releasing the brake or requiring other manipulation which interferes with the operator's full control of the vehicle, an accelerator control is associated with the brake pedal 13 within reach of the operator's foot when resting thereon for braking the vehicle or in constant readiness therefor. For that purpose, a bracket 14 is fastened to the underside of the pedal 13 by means of threaded studs 15, it being positioned forwardly accessible to toe manipulation.

A toe rest 16 is integrally or otherwise secured to the bracket 14 for disposition forwardly of the pedal 13. An accelerator foot control 17 terminates in a semi-circular quadrant 18 for pivotal secural to a lug 19 which is formed on the bracket 14. A pin 20 extends therethrough for pivotally supporting the quadrant 18 axially thereof so that the foot control 17 normally assumes a position adjacent the toe rest 16 so that it may be actuated with the desired uniformity and precision.

A bevel gear sector 21 is integrally or otherwise associated with the quandrant 18 to mesh with a bevel gear 22 which is secured to a shaft 23 for rotation therewith. The shaft 23 has one extremity thereof journalled in a bearing bracket 24 which is supported through an angular extension 25 thereon. The accelerator control supporting pin 20 projects through an aperture in the bracket 25 to support the gear sector 21 and bevel gear 22 in fixed meshing relation for pivotal movement relative to the pedal 13.

The shaft 23 extends through the vehicle body 10 into the engine compartment to slidably carry a bevel gear 26. The gear 26 is supported by a bracket 27 which has a collar 28 formed thereon to rotatively engage the hub thereof, thereby supporting the bevel gear 26 in a fixed inclined position to receive the shaft 23 axially therethrough. The bracket 27 has a flanged extremity 29 which engages the correspondingly formed engine crankcase flange 30 of standard construction in the vicinity of the carburetor (not shown). This is effected by resort to a bolt 31 arranged to engage a threaded aperture from whence a crankcase bolt previously had been removed for that purpose.

As shown, the bracket 27 carries a laterally extending bearing 32 to rotatively receive a stud shaft 33 which is journalled therein and maintained in position by a collar 34. A lever 35 has a bored extremity 36 thereof secured to the shaft 33 to rotate or oscillate therewith by virtue of a bevel gear 37 fixed thereon to mesh with the gear 26. A throttle control rod 38 which is operatively connected to a carburetor (not shown), has one extremity thereof in pivotal engagement with the free extremity 39 of the lever 35 so that oscillatory movement of the shaft 23 will cause corresponding oscillation of the lever 35 to impart the required movement to the rod 38 in operative connection with the carbureter. It is to be noted that the shaft 23 is splined to present diametrically opposed keyways 40 which loosely engage correspondingly shaped and positioned keys 41 formed on the interior of the bore 42 projecting axially through the gear 26.

The bore 42 is of a diameter somewhat larger than the shaft 23 so that the latter may oscillate therein in a vertical plane as well as slide therethrough responsive to pivoting the brake pedal 13. This movement takes place while the brake pedal is actuated without any accelerating effect whatsoever. The accelerater control 17 may, however, be depressed in any position of the brake pedal 13 without removing the operator's foot, thereby enabling full control with minimum effort and requirement for use of emergency brake or hand acceleration in starting on inclines or other difficult positions of travel. A coil spring 43 envelopes the pin 20 to impart an urge to the accelerator control 17 for normally effecting the return thereof to initial position coincident with the idling engine speed; however any other suitable means may be employed for this purpose.

Various changes may be made in the embodiment of the invention herein specifically described without departing from or sacrificing any advantages thereof as defined in the appending claims.

I claim:

1. In a device of the character described, the combination with a vehicle control foot pedal, of an accelerator foot control lever mounted on said foot pedal for movement relative thereto, a throttle control lever, a shaft interposed between said accelerator and throttle conrol levers, and gear connections between said shaft and control levers, said shaft being longitudinally slidable relative to said throttle control lever in operative connection therewith responsive to said accelerator lever and irresponsive to said vehicle control foot pedal.

2. In a device of the character described, the combination with a vehicle crankcase, of a foot governing pedal for said vehicle, an accelerator pedal mounted on said foot pedal for movement relative thereto, a gear sector on said accelerator pedal, a shaft carrying a gear in mesh with said gear sector, a gear operated throttle lever mounted on said crankcase, and a gear slidably carried by said shaft in mesh with said gear operated throttle lever to impart movement thereto solely by actuating said accelerator pedal.

3. In a device of the character described, the combination with a vehicle crankcase, of a foot governing pedal for said vehicle, an accelerator pedal mounted on said foot pedal for movement relative thereto, a gear sector on said accelerator pedal, a shaft carrying a gear in mesh with said gear sector, a gear operated throttle lever mounted on said crankcase, and a gear slidably carried by said shaft for rockable movement therein to mesh with said gear sector operated throttle lever to impart movement thereto responsive to said accelerator pedal and irresponsive to movement of said foot pedal.

In witness whereof, I subscribe my name.

CHARLES R. CRANNELL.